United States Patent
Tailleur et al.

(10) Patent No.: US 10,654,209 B2
(45) Date of Patent: May 19, 2020

(54) METHOD AND DEVICE FOR PRODUCING RUBBER-COATED METAL WIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Julien Tailleur, Clermont-Ferrand (FR); Patrice Monnereau, Clermont-Ferrand (FR); Davy Vernier, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE, S.A., Granges-Paccot (CH)

( * ) Notice: Subject to any disclaimer, the term of this patent is extended or adjusted under 35 U.S.C. 154(b) by 555 days.

(21) Appl. No.: 15/323,020

(22) PCT Filed: Jun. 23, 2015

(86) PCT No.: PCT/EP2015/064109
§ 371 (c)(1),
(2) Date: Dec. 29, 2016

(87) PCT Pub. No.: WO2016/001013
PCT Pub. Date: Jan. 7, 2016

(65) Prior Publication Data
US 2017/0136675 A1   May 18, 2017

(30) Foreign Application Priority Data

Jun. 30, 2014 (FR) ...................................... 14 56187

(51) Int. Cl.
*B29C 48/154* (2019.01)
*B29C 48/25* (2019.01)
(Continued)

(52) U.S. Cl.
CPC .......... *B29C 48/154* (2019.02); *B29B 15/122* (2013.01); *B29C 48/269* (2019.02);
(Continued)

(58) Field of Classification Search
CPC ..... B29C 48/154; B29C 48/865; B29C 48/34; B29C 48/269; B29C 48/2883;
(Continued)

(56) References Cited

U.S. PATENT DOCUMENTS

| 2,105,812 A | 1/1938 | Gordon et al. |
| 3,635,621 A | 1/1972 | Miyauchi et al. |

(Continued)

FOREIGN PATENT DOCUMENTS

| CN | 1145959 | 3/1997 |
| CN | 101332651 | 12/2008 |

(Continued)

*Primary Examiner* — Robert J Grun
(74) *Attorney, Agent, or Firm* — Dickinson Wright PLLC; Steven Hurles

(57) ABSTRACT

A method and device for producing metal wire by sheathing a wire with an elastomer compound coming from an extruder is described herein. The aspects disclosed herein may include a feed canal for feeding a sheathing die, through which the wire is made to pass at a pre-established nominal speed. Various temperatures are controlled during the method based on a variety of parameters such as the measured speed at which the wire is moving is other than the nominal speed.

15 Claims, 3 Drawing Sheets

(51) Int. Cl.

| | |
|---|---|
| *B29C 48/92* | (2019.01) |
| *B29C 48/285* | (2019.01) |
| *B29C 48/86* | (2019.01) |
| *B29D 30/38* | (2006.01) |
| *B29B 15/12* | (2006.01) |
| *B29C 48/34* | (2019.01) |
| *B29C 48/88* | (2019.01) |
| *B29C 48/00* | (2019.01) |
| *B29L 31/34* | (2006.01) |
| *B29C 48/05* | (2019.01) |
| *B29K 21/00* | (2006.01) |
| *B29K 705/00* | (2006.01) |
| *B29L 30/00* | (2006.01) |

(52) U.S. Cl.
CPC .......... *B29C 48/2883* (2019.02); *B29C 48/34* (2019.02); *B29C 48/865* (2019.02); *B29C 48/92* (2019.02); *B29D 30/38* (2013.01); *B29C 48/022* (2019.02); *B29C 48/05* (2019.02); *B29C 48/872* (2019.02); *B29C 48/9135* (2019.02); *B29C 2948/92085* (2019.02); *B29C 2948/92123* (2019.02); *B29C 2948/92209* (2019.02); *B29C 2948/92438* (2019.02); *B29C 2948/92447* (2019.02); *B29C 2948/92704* (2019.02); *B29C 2948/92904* (2019.02); *B29K 2021/00* (2013.01); *B29K 2705/00* (2013.01); *B29K 2905/02* (2013.01); *B29K 2995/0008* (2013.01); *B29L 2030/003* (2013.01); *B29L 2031/3462* (2013.01)

(58) Field of Classification Search
CPC .................... B29C 48/92; B29C 48/05; B29C 2948/92209; B29C 2948/92904; B29C 2948/92447; B29C 2948/92438; B29C 2948/92123; B29C 48/9135; B29C 48/872; B29C 48/022; B29C 2948/92704; B29C 2948/92085; B29D 30/38; B29B 15/122; B29L 2031/3462; B29L 2030/003; B29K 2905/02; B29K 2995/0008; B29K 2021/00; B29K 2705/00

See application file for complete search history.

(56) References Cited

U.S. PATENT DOCUMENTS

| | | | |
|---|---|---|---|
| 5,783,127 | A | 7/1998 | Gross et al. |
| 2002/0158357 | A1 | 10/2002 | Swanson et al. |
| 2003/0111254 | A1* | 6/2003 | Dean .................. C08L 81/02 174/110 R |
| 2003/0152658 | A1 | 8/2003 | Ogino |
| 2008/0295953 | A1 | 12/2008 | Nicolas |
| 2013/0113133 | A1 | 5/2013 | Kashikar |
| 2014/0284838 | A1 | 9/2014 | Pfeffer et al. |

FOREIGN PATENT DOCUMENTS

| | | |
|---|---|---|
| DE | 102011118719 A1 | 5/2013 |
| JP | 2001121597 A | 5/2001 |
| JP | 2006-027068 A | 2/2006 |
| WO | 02/20898 A2 | 3/2002 |
| WO | 02/20898 A3 | 3/2002 |
| WO | 2010112445 A1 | 10/2010 |
| WO | 2011/131664 A1 | 10/2011 |

* cited by examiner

METHOD AND DEVICE FOR PRODUCING RUBBER-COATED METAL WIRE

CROSS-REFERENCE TO RELATED APPLICATIONS

This Application is a 371 National Phase Entry of PCT/EP2015/064109, Filed 23 Jun. 2015, which Claims the Benefit of French Patent Application No. 1456187 Filed 30 Jun. 2014, the Contents of which are Incorporated Herein by Reference for all Purposes

BACKGROUND

The disclosure relates to the field of the production of metal wires intended for the creation of tire reinforcements. In general, these wires are used to produce the reinforcing plies made up of lengths of wire coated in a rubber compound, parallel to one another, and making a given angle with the longitudinal direction of the ply.

These wires may be individual wires or assemblies of wires obtained by plying individual metal wires together.

To improve their strength, some of these wires, of the type of wires formed by assembly, have the particular feature of having a core coated with rubber. These wires are rubberized during their manufacture with rubber in the uncured state in order to improve their corrosion resistance and therefore their endurance notably in tire carcass reinforcements for industrial vehicles.

In the known way, these rubberized wires are subjected to significant stresses when the tires are being driven on, notably to bending or variations in curvature repetitively giving rise to friction in the wires which lead to wearing or fatigue of the wires. As a result, it is very important for these wires to be impregnated with rubber as much as possible and for the rubber to penetrate as well as possible into the spaces between the wires when several of these wires are assembled to form cords.

Typically, the wires are coated with a rubber compound coming from an extruder the outlet of which opens into a sheathing head comprising a sheathing die through which the wire or assembly of wires for coating passes. The operating parameters of the extruder are chosen in such a way as to ensure uniform coating of the wire or wires passing through the sheathing die.

DESCRIPTION OF RELATED ART

Documents U.S. Pat. No. 2,105,812, U.S. 2003/152658, JP 2001 121597 and DE 10 2011 118719 describe devices which coat metal wires with viscous polymer or rubber compounds using an extruder and a sheathing head.

Thus, it has been found that, for a given rubber compound and a given reinforcing wire, the parameters that have to be taken into consideration in order to achieve good coating of the wire are: the temperature of the compound, the temperature of the walls of the extruder and of the sheathing die, the temperature of the reinforcing wire, the diameter and shape and surface finish of the sheathing die and the pressure of the compound in the coating zone and in the sheathing die. These parameters are optimized for a nominal speed of travel of the wire for coating through the sheathing die.

Document U.S. 2002/0158357 is known and describes a machine for coating a very thin cord (having a diameter of 25 µm) with a very thin polymer compound. In order to obtain a coating that is uniform and of constant thickness, a heating element is arranged at the outlet of the coating die and surrounds the coated cord. This heating element is controlled in such a way as always to provide a pre-established temperature at the exit of the coating die. Video cameras monitor the coated wire leaving the machine and alert the operator to the onset of any coating defect. The operator has then to make adjustments to the machine in order to obtain uniform coating. These adjustments performed by the operator have a negative impact on productivity.

Document WO 02/20898 describes another example of a device for producing a composite cord by coating a glass cord with a protective resin in which the device is provided with a heating element arranged at the exit die. However, according to that document, control over the heating element is exerted by the operator using temperature sensors, according to the type of resin used.

SUMMARY

In the process of producing rubber-coated reinforcing wires, the speed at which the wire travels through the sheathing die is made to vary, being conditional on the speed at which the wire passes through a process further upstream or downstream.

It has thus been found that, when the speed of travel through the die varies, the wire passing through the die is no longer coated uniformly. This phenomenon is all the more pronounced during phases of coating shut down or start up. During these shut down and start up phases, wires are obtained which are no longer coated with rubber and are therefore not as strong. When the wires have poorly sheathed parts or parts with no coating, the unsheathed parts need to be cut out and removed, which results in losses of material and loss of productivity.

In order to overcome these problems, the proposal is to influence the parameters that influence the coating of the wire with an elastomer compound in order to adapt these to suit the speed at which the wire is travelling. However, it is found that, if there is a desire to vary the temperature of the compound, it is necessary to alter the operating parameters of the extruder. However, given the significant thermal inertia of the extruder and the fairly long time it takes for the compound to stabilize, this solution involves operating times which are incompatible with a coating system that needs to operate continuously and be highly responsive to the changes in speed, and all this without adversely affecting the properties of the coating rubber.

Moreover, during tests performed in a laboratory, it has been found that the variation in pressure of the rubber compound in the sheathing zone has no impact on the coating when the speed at which the wire travels is near zero. This parameter cannot therefore be taken into consideration during machine shut-down or restart phases.

It is an object of the invention to propose a method and a device for coating a reinforcing wire with a rubber compound that are able to afford a solution to these problems.

This object is achieved with a method for producing metal wire by sheathing a wire with an elastomer compound coming from an extruder comprising a feed canal feeding a sheathing die through which the said wire is made to pass at a pre-established nominal speed $V_n$, characterized in that the temperature of the downstream end of the sheathing die is varied for a predetermined duration and independently of the rest of this die when the measured speed $V_m$ at which the wire is moving is other than $V_n$.

According to the invention, the temperature at the exit of the sheathing die is varied when a variation in the speed of the wire with respect to a pre-established nominal speed that corresponds to nominal operation of the rubber-coated wire manufacturing line is detected. Means for rapidly heating the downstream end of the sheathing die are called into operation in order to obtain an instantaneous variation in the temperature of the compound and of the wire to adapt this to suit the speed at which the latter is passing through the sheathing die without the need to act on the extruder operating parameters. This then yields a rapid variation in the temperature of the elastomer compound which variation is localized at the exit of the sheathing die but does not vulcanize the elastomer compound passing through same. Thus, the energy that needs to be transmitted and the heating time are controlled by the automation system, allowing control over the amount of energy to be transmitted according to the conditions at which the wire is fed. By way of example, when the order to heat is given, a quantity of energy of around 4.5 kJ is sent to the exit of the die for a maximum duration of 10 sec.

The method of the invention may also comprise, alone or in combination, the following features:
- a reference temperature Tn is applied to the downstream end of the sheathing die when the measured speed at which the wire is travelling is equal to a pre-established nominal speed Vn and in that at least one reference temperature Ttrans>Tn is applied for a duration shorter than the duration for which the measured speed is different from the nominal speed and the wire is accelerated;
- a reference temperature Tn is applied to the downstream end of the sheathing die when the measured speed at which the wire is travelling is equal to a pre-established nominal speed Vn and in that at least one reference temperature Ttrans>Tn is applied for a duration equal to the duration for which the measured speed is different from the nominal speed and the wire is slowed;
- the temperature reference Ttrans applied is greater than Tn and follows a variation law proportional to the measured speed at which the wire is travelling;
- the temperature reference Ttrans applied is greater than Tn and follows a variation law proportional to the variation in the diameter of the wire;
- a temperature reference Tna is applied to the downstream end of the sheathing die when the wire is stationary, it being possible for this reference to be equal to Tn or different therefrom;

This objective is also achieved with a device for producing metal wire by sheathing a wire with an elastomer compound coming from an extruder comprising a feed canal feeding a sheathing die through which the said wire is made to pass at a pre-established nominal speed Vn, between an unwinding spool and a winding spool, characterized in that it comprises a thermally conducting tip in thermal contact with the downstream end of the sheathing die, the said tip comprising heating means controlled by thermal regulation means connected to means for measuring the speed at which the wire is travelling so as to regulate the said tip heating means when the measured speed Vm at which the wire is travelling is different from the nominal speed Vn.

It was found during laboratory tests that superheating the elastomer compound rapidly (of the order of a few seconds) during transient phases of operation makes the compound more fluid and therefore able to sheath the wire at low speed. However, it is necessary to ensure a rapid return to the pre-established optimum sheathing temperature in order to obtain uniform deposition when the speed of travel of the wire returns to its nominal operating speed. In order to ensure this rapid transition between an instantaneous influx of heat energy and a rapid removal of same to the outside, use is made of a thermally conducting tip attached to the die and which comprises its own heating means which are operated independently of the other heating means of the device, and which is performed in such a way as to offer low thermal inertia. This then yields a wire sheathed along its entire length, for any value of speed and any phase of operation of the device, thereby making it possible to obtain a clear gain in productivity, while at the same time avoiding unsheathed zones.

The device of the invention may also comprise, alone or in combination, the following features:
- the thermally conducting tip surrounds the front end of the sheathing die and is produced in such a way that when powered, its heating means succeed in increasing the temperature of the said tip by 30 to 50° C. in a time less than or equal to 10 sec; thus, the thermally conducting tip of the invention succeeds in locally and rapidly raising the temperature without influencing the temperature of the sheathing head or of the extruder;
- the thermally conducting tip comprises, or collaborates with, cooling means so as to return rapidly to normal operation outside of the transient speed periods;
- the thermally conducting tip is mounted removably or interchangeably on the downstream end of the sheathing die in order to be able to be fitted thereto;
- the device comprises a sensor for measuring the diameter of the sheathed wire and the temperature of the thermally conducting tip is adjusted according to the diameter of the sheathed wire, in order to further improve the quality of the sheathing;
- the downstream part of the sheathing die is thermally insulated from the rest of the die, making it possible more accurately to target the influx of heat energy;
- the thermally conducting tip is automatically retractable, making it possible, if need be, to remove the heat energy more rapidly by moving the tip further away from the rest of the die;
- the thermally conducting tip is made of a material with high thermal diffusivity, preferably from aluminium; a material with high thermal diffusivity (such as copper or aluminium) and therefore a good ability to transmit heat is preferred because the thermally conducting tip of the invention needs to have low thermal inertia so that it can be highly responsive to the changes in speed of the wire that is to be sheathed; a tip with a low density and a high thermal conductivity is thus preferred;
- the thermally conducting tip is an induction coil and the downstream end of the sheathing die is made from a ferromagnetic material; in this case, when powered, the tip allows the downstream end of the sheathing die to be heated directly by induction.

According to the invention, a wire is to be understood to mean a filamentary reinforcing element which may be made up of a single wire or of an assembly of single wires forming an individual strand or cord or an assembly of cords known as a multistrand rope. An individual strand generally is understood to mean a layered cord made up of a central cord or core and of one or more concentric outer layers arranged around the core. The three layered cords most widely used are cords of M+N+P construction formed of an M wire core, M varying from 1 to 4, of an intermediate layer N, N varying from from 3 to 12, surrounded by an external layer of P wires, P varying from 8 to 20.

BRIEF DESCRIPTION OF THE DRAWINGS

The following description relies on FIGS. 1 to 3 in which.

DETAILED DESCRIPTION

Figure 1:
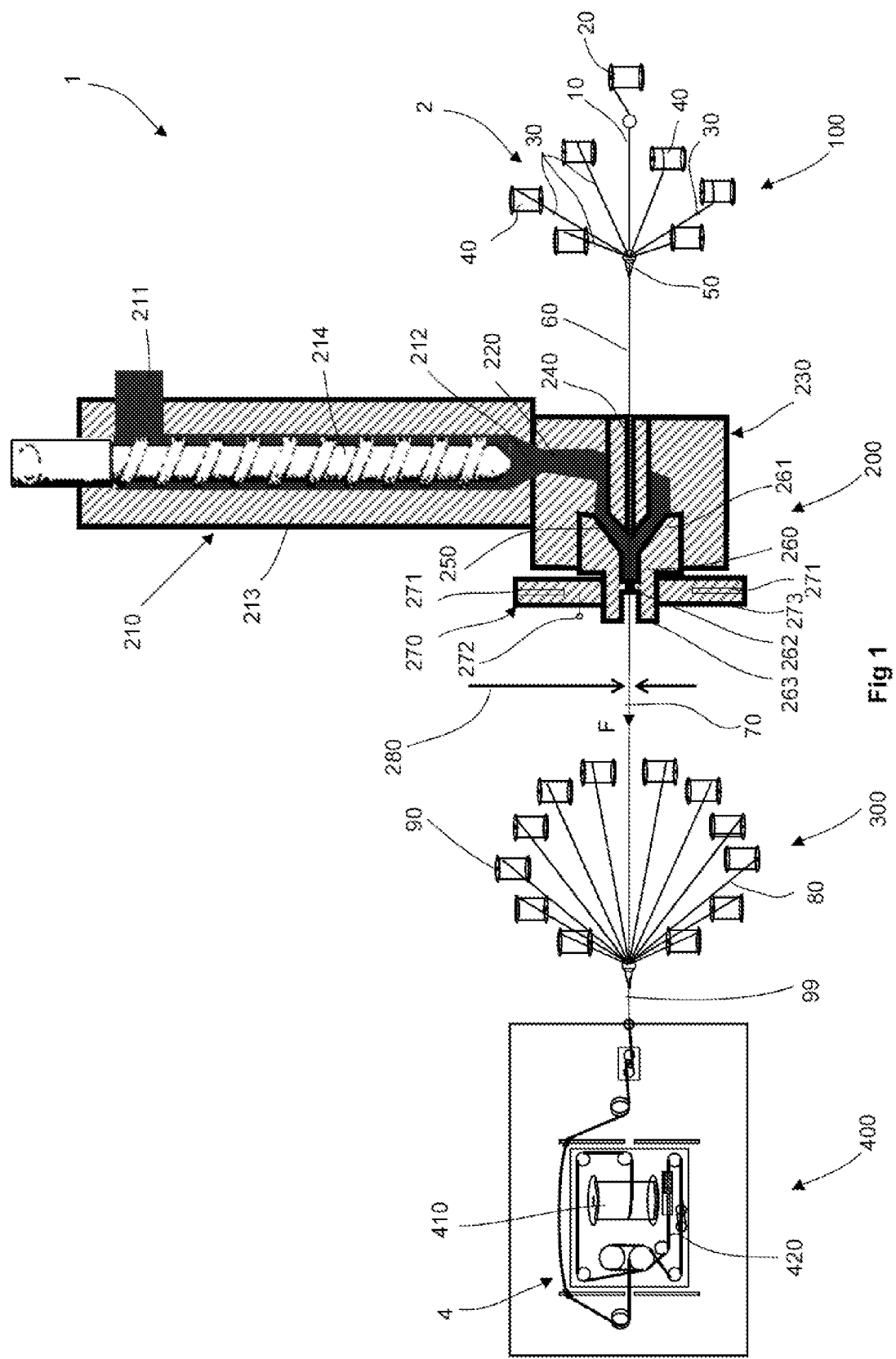
FIG. 1 illustrates a device for assembling and rubberizing wires using the extruder of the invention.

FIG. 1 illustrates a device 1 for assembling and rubberizing wires comprising an extruder and a sheathing die according to the invention. In this device, a single core wire 10 delivered by a feed reel 20 is assembled with six other wires 30 delivered by feed reels 40 to form, at an assembly point 50 of a first unwinding zone 100, a plied together assembly or a core strand known in what follows as the wire 60. The wire 60 is sheathed as it passes through a sheathing zone 200 and progresses in the direction of the arrow F. The sheathed wire 70 arrives at an assembly zone 300 in which it is assembled by being plied together with other wires 80 of the outer layer of the assembly, there being twelve of these in the example illustrated, delivered by feed reels 90. The final cord 99 thus obtained is finally collected in a winding zone 400 on the rotary receiver 410, after having passed through twist balancing means 420 consisting, for example, of a straightener or twister straightener. Such a device for producing multilayer cords is better described in document WO 2010/112445 in the name of the applicants.

The sheathing zone 200 comprises an extruder 210 comprising a barrel 213 provided with an elastomer compound feed inlet and with a homogenized compound outlet 212 for compound delivered at a given pressure, given temperature and given flow rate by a screw 214. The outlet 212 opens into a feed canal 220 of a sheathing head 230. The sheathing head 230 comprises a wire guide 240 situated at the inlet of the sheathing head, as viewed in the direction in which the wire 60 travels, which is extended by a coating chamber 250 into which the feed canal 220 opens. The direction in which the elastomer compound flows is perpendicular to the direction in which the wire 60 travels. The sheathing of the wire is performed in a sheathing die 260 comprising an upstream end forming a convergent nozzle 261 around the coating chamber 250 and a calibration downstream end 262 the outlet of which has a calibrated internal diameter that defines the diameter of the sheathed wire. The sheathing die is made of steel, the upstream 261 and downstream 261 parts potentially being made as a single piece, as illustrated, or several pieces. In a known way, the sheathing head 260 comprises its own heating elements connected to a temperature probe (not depicted in the drawings) and to means of thermal regulation of these heating means.

According to the invention, a thermally conducting tip 270 is added to the downstream end 262 of the sheathing die. The thermally conducting tip 270 is arranged in such a way as to be in thermal contact with the sheathing die 260, for example by being mounted directly on the downstream end 262 thereof. In an alternative form, the thermally conducting tip 270 contains the sheathing die.

In the example illustrated, the thermally conducting tip 270 is mounted removably or interchangeably on the downstream end of the sheathing die 262. Thus it is produced in the form of a radially split cylindrical collar which is fixed by fixing screws to the outside diameter of the projecting part 263 of the sheathing die 260.

For the purposes of the invention, the thermally conducting tip 270 needs to have a low mass and a low thermal inertia so that it reacts quickly to the needs to regulate the temperature of the device, as will be explained hereinafter. Thus, the thermally conducting tip 270 is preferably made of aluminium or of another material with high diffusivity; it has a mass of around 200 g for an outside diameter of 72 mm, an inside diameter of 20 mm and a thickness of 17.5 mm. The tip is in direct contact with the downstream end 262 forming the calibration part of the sheathing die 260 or, when there is a thermally conducting wall between the two of them, the thickness thereof must not exceed 10 mm. For the purposes of the invention also, the thermally conducting tip 270 is provided with one or more heating elements 271, of the screened resistor or heating band type, able to provide a significant heating power. In the example illustrated, the tip comprises three screened resistive elements each having a power of 150 W. A temperature probe 272 is embedded in the thermally conducting tip 270 and is connected to thermal regulation means to control the supply of power to the heating elements 271, as will be explained hereinafter.

For the purposes of the invention also, the thermally conducting tip 270 needs to be able to remove the heat energy very quickly according to the command received from the thermal regulation means. To do that, the tip needs to have a frontal surface area 273 that is large for a small thickness, so as to be able to cool down rapidly by natural convection, for example a ratio between the width of the frontal annular zone and the thickness thereof being greater than 2. In the example illustrated, the time taken to cool the tip is approximately 3 to 6 min. In order to accelerate its cooling by natural convection, the frontal surface area 273 of the tip is provided with cooling fins. In an alternative form, the tip may be cooled using a forced convection cooling system, for example a fan arranged nearby or by circulating a cooling fluid through ducts that pass through the heating tip or which are in thermal contact with the periphery thereof.

In an alternative form (not illustrated), the thermally conducting tip is automatically retractable so as to allow it better cooling.

At the exit from the sheathing die, there is a measurement sensor 280 for measuring the diameter of the sheathed wire 70, for example a laser sensor, which transmits information to the thermal regulation means 150 (FIG. 2) of the device 1.

Figure 2:
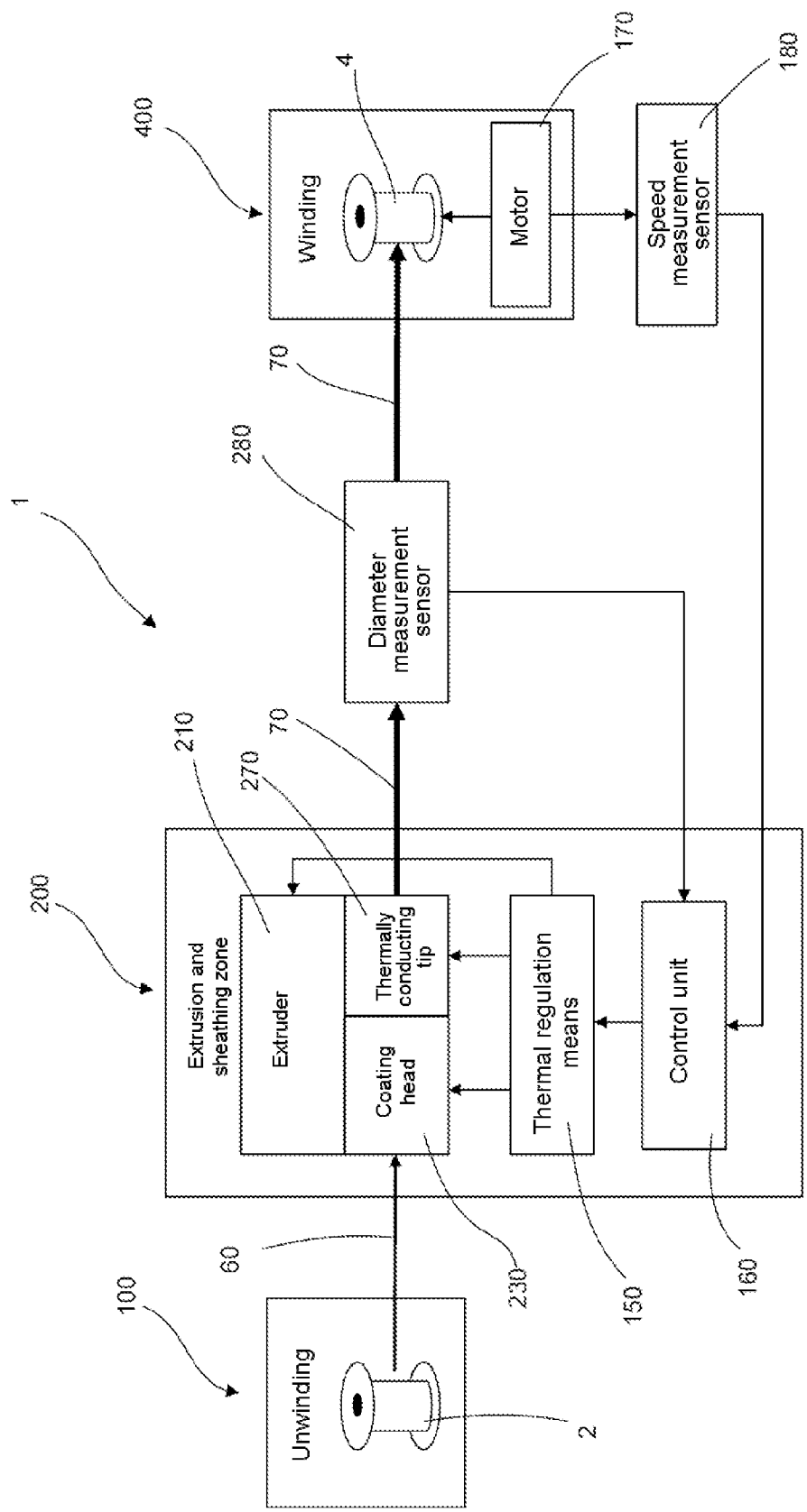
FIG. 2 is a block diagram of the wire assembly and rubberizing device of FIG. 1.

FIG. 2 is the functional diagram of the device 1 of the invention. The wire circulates at a given speed or nominal speed Vn through the sheathing head 230 of the sheathing zone 200 and is tensioned between unwinding means depicted by an unwinding reel 2 in the unwinding zone 100 and winding means depicted by a reel 4 in the winding zone 400. The winding reel 4 is rotated by an electric motor 170 the rotational speed of which is measured by a speed sensor 180. The measured values of the winding speed are transmitted to an automatic controller or control unit 160 which operates the thermal regulation means 150 of the sheathing zone 200 which control the operating parameters of the extruder 210 (notably the rotational speed of the screw 214, the regulation of the heating elements of the barrel 213), the regulation of the heating elements that heat the extrusion head 230 and of the heating elements that heat the thermally conducting tip 270. Stored in the memory of the control unit 160 are recipes which assign reference values to the various operating parameters of the components of the sheathing zone 200 according to the elastomer compound used and according to the desired thickness of coating. These recipes are established for a nominal value of speed of travel of the wire through the device 1 of the invention which corresponds to an optimum operating speed for the assembly line. When variations in the speed of the assembly line occur, these variations are detected by the speed sensor 180 and transmitted to the control unit 160 which acts on the reference values for the temperature of the thermally conducting tip 270.

Figure 3:
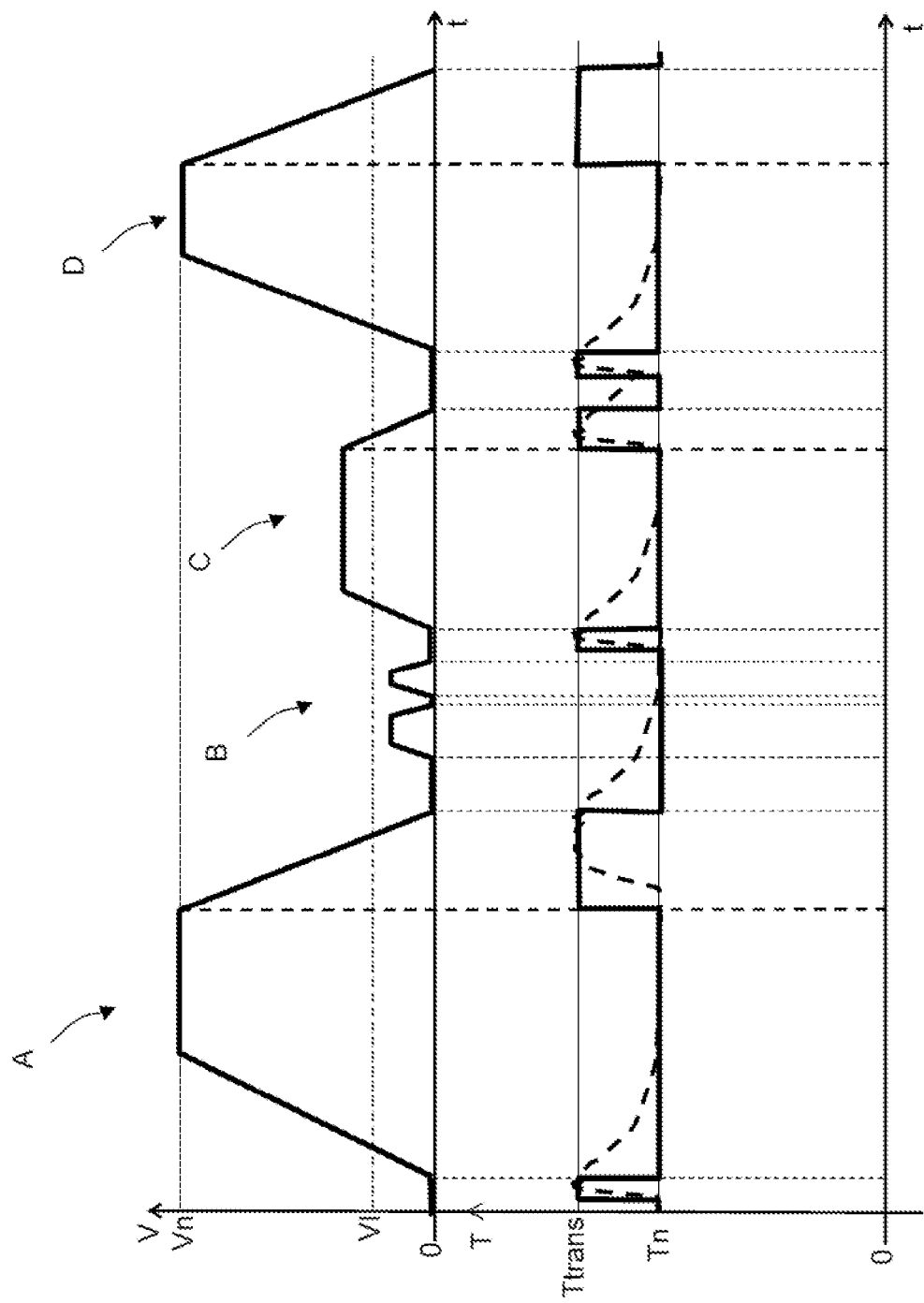
FIG. 3 is a diagram illustrating the variation in the speed of travel of the wire to be rubberized and in the temperature near the exit of the extruder of the invention, as a function of time.

The diagram of FIG. 3 illustrates the variation in speed of the line V as a function of time t, corresponding to the various phases of operation of the assembly line and, in parallel underneath, the corresponding variations in the temperature T of the thermally conducting tip 270 operated by the control unit 160. Thus it may be noted that, when the assembly line is running in the steady state at the nominal speed, the thermally conducting tip 270 is temperature regulated to a nominal temperature reference Tn. The variation in reference temperature of the tip (the values of which are controlled by the control unit 160) is represented as a continuous line and the actual variation in its temperature (caused by the thermal inertia of the various components of the sheathing head) is represented in broken line in this diagram.

With reference to FIG. 3, operation of the line in zone A corresponds to a start-up phase followed by a phase of operation of the line at nominal speed Vn, then by a phase of deceleration and shutting down of the line. The diagram illustrating the variation in temperature and situated underneath shows that, as soon as the control unit 160 gives the command to start the line, a reference temperature is imposed on the thermally conducting tip 270, at a transition value Ttrans higher than the nominal reference value Tn that the regulation means attempt to achieve rapidly and to do so for a very short length of time, less than or equal to 10 sec. Once the tip temperature has reached the reference temperature Ttrans, the line is allowed to start. As soon as start up has been completed, the reference temperature imposed on the tip is Tn again, because the actual temperature of the tip is higher than the nominal temperature even for a line speed below the sheathing limit speed V1 (the speed at which, at the reference temperature Tn, the wire cannot be uniformly rubberized). As soon as the control unit 160 of the assembly line gives the command to decelerate, a new full power heating of the tip is commanded, imposing a high temperature reference Ttrans to it, this being until such time as the line is shut down. After the line shuts down, the temperature reference of the tip is brought back down to Tn, so that it is ready to receive a further command. Phase B corresponds to a threading operation (making knots by assembling wires end to end), phase C to a knot passing operation, at a speed lower than the nominal speed of the line and phase D corresponds to a phase of operation identical to that of phase A, but for a shorter duration. Other combinations of operating steps may be envisioned, and the temperature of the thermally conducting tip 270 will be regulated accordingly.

By way of example, the acceleration and deceleration phases have a duration of the order of 5 to 40 sec. Also by way of example, the speed Vn is approximately 80 m/min and the thermal regulation means power the heating elements as soon as they receive a start of cycle or end of cycle command.

For preference, the reference value Ttrans is 30 to 50° C. greater than the temperature value Tn.

In another embodiment of the invention, regulation of the thermally conducting tip may be performed according to various transition temperature reference values Ttrans1 to Ttransi, beyond the nominal one Tn.

In an alternative form, the values for the reference temperature of the thermally conducting tip are chosen to be proportional to the speed v of the assembly line.

In yet another alternative form, the values for the reference temperature of the thermally conducting tip during operation at a pre-established nominal speed of the assembly line are chosen to be proportional to the values of the diameter of the sheathed wire 70 as measured by the sensor 280. Thus, regulation of the thermally conducting tip can be used to govern the thickness of the sheathing rubber.

In another alternative form, the reference value for the temperature when the line is shut down may be chosen to have a value different from the nominal operating temperature Tn.

In an alternative form of embodiment of the invention, the thermally conducting tip is replaced by an induction coil which surrounds the part forming the downstream end 262 of the die (or part containing the calibration portion of the sheathing die when this die is created as an assembly of several components), this part being made of a ferromagnetic material. Supply of power to the induction coil is controlled by the control unit 160 in such a way as to obtain the same reference temperatures at the calibration of the sheathing die.

According to yet another alternative form, the calibration part of the sheathing die is supported by a component which is thermally insulated from the rest of the sheathing head 230 so as to be able to control more accurately the heating of the thermally conducting tip with which it is in thermal contact.

Other alternative forms and modes of embodiment of the invention may be envisaged without departing from the scope of its claims.

Thus, the rubberizing zone 200 may be present at several locations along the path of the wire, if this wire needs to be rubberized. Thus, a rubberizing zone 200 may be arranged in the path of the wire 10 after it leaves the reel 20 and before it is assembled with the wires 30, it being possible for this zone to be present in addition to or instead of the sheathing zone 200 for the assembly of which the wire 60 is formed. Likewise, the device and method of the invention may be applied to the rubberizing of an individual wire just as it may be applied to the rubberizing of an individual strand or of a multistrand rope.

The invention claimed is:

1. A method for producing metal wire by sheathing a wire with an elastomer compound from an extruder comprising:
    feeding a sheathing die, via a feed canal through which the wire is made to pass;
    measuring a speed of the wire to determine a measured speed Vm;
    controlling a temperature of a downstream end of the sheathing die so that the temperature is varied for a predetermined duration and independent of other parts of the sheathing die when the measured speed Vm at which the wire is moving is other than a pre-established nominal speed Vn.

2. The method according to claim 1, wherein a nominal reference temperature Tn is applied to the downstream end of the sheathing die when the measured speed at which the wire is travelling is equal to the pre-established nominal speed Vn, and in that at least one transition temperature Ttrans is applied for a duration shorter than the duration for which the measured speed Vm is different from the pre-established nominal speed Vn and the wire is accelerated and wherein the transition temperature Ttrans is greater than the nominal reference temperature Tn.

3. The method according to claim 2, wherein a stationary temperature reference Tna is applied to the downstream end of the sheathing die when the wire is stationary.

4. The method according to claim 1, wherein a nominal reference temperature Tn is applied to the downstream end of the sheathing die when the measured speed at which the wire is travelling is equal to the pre-established nominal speed Vn and in that at least one transition temperature Ttrans is applied for a duration equal to the duration for which the measured speed Vm is different from the pre-established nominal speed Vn and the wire is slowed.

5. The method according to claim 4, wherein the transition temperature Ttrans applied is greater than the nominal reference temperature Tn and varies proportional to the measured speed at which the wire is travelling.

6. The method according to claim 4, wherein the transition temperature Ttrans applied is greater than the nominal reference temperature Tn and varies proportional to the variation in the diameter of the wire.

7. A device for producing metal wire by sheathing a wire with an elastomer compound coming from an extruder, comprising:
    a feed canal to feed a sheathing die through which the wire is made to pass at a pre-established nominal speed Vn, between an unwinding spool and a winding spool;
    a thermally conducting tip in thermal contact with the downstream end of the sheathing die, the said conducting tip includes heating means controlled by thermal regulation means connected to means for measuring the speed at which the wire is travelling so as to regulate the said tip heating means when the measured speed Vm at which the wire is travelling is different from the nominal speed Vn.

8. The device according to claim 7, wherein the thermally conducting tip surrounds the front end of the sheathing die and is produced in such a way that when powered, the heating means increases the temperature of the said tip by 30 to 50° C. in a time less than or equal to 10 sec.

9. The device according to claim 7, wherein the thermally conducting tip includes cooling means.

10. The device according to claim 7, wherein the thermally conducting tip is removable.

11. The device according to claim 7, further comprising a sensor to measure the diameter of the sheathed wire, wherein the temperature of the thermally conducting tip is adjusted according to the diameter of the sheathed wire.

12. The device according to claim 7, wherein the downstream part of the sheathing die is thermally insulated from other parts of the die.

13. The device according to claim 7, wherein the thermally conducting tip is automatically retractable.

14. The device according to claim 7, wherein the thermally conducting tip is made of a material with a predetermined thermal diffusivity.

15. The device according to claim 7, wherein the thermally conducting tip is an induction coil and in that the downstream end of the sheathing die is made from a ferromagnetic material.

* * * * *